(12) United States Patent
Aggarwal et al.

(10) Patent No.: US 8,351,519 B2
(45) Date of Patent: Jan. 8, 2013

(54) EMBEDDING INFORMATION IN AN 802.11 SIGNAL FIELD

(75) Inventors: Alok Aggarwal, Foster City, CA (US); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 12/269,201

(22) Filed: Nov. 12, 2008

(65) Prior Publication Data

US 2010/0040158 A1 Feb. 18, 2010

Related U.S. Application Data

(60) Provisional application No. 61/089,192, filed on Aug. 15, 2008.

(51) Int. Cl.
  *H04L 27/28* (2006.01)
  *H04L 27/00* (2006.01)
(52) U.S. Cl. ........................ 375/260; 375/259
(58) Field of Classification Search .................. 375/360, 375/260, 295, 316, 285
  See application file for complete search history.

(56) References Cited

U.S. PATENT DOCUMENTS

| | | | |
|---|---|---|---|
| 5,537,410 A * | 7/1996 | Li | 370/465 |
| 5,541,955 A * | 7/1996 | Jacobsmeyer | 375/222 |
| 5,815,488 A * | 9/1998 | Williams et al. | 370/206 |
| 6,373,861 B1 * | 4/2002 | Lee | 370/503 |
| 7,269,430 B2 | 9/2007 | Moorti et al. | |
| 7,738,538 B1 * | 6/2010 | Tung | 375/150 |
| 2005/0220209 A1 | 10/2005 | Lewis | |
| 2005/0271157 A1 | 12/2005 | Van Zelst et al. | |
| 2005/0276347 A1 | 12/2005 | Mujtaba et al. | |
| 2005/0286474 A1 | 12/2005 | Van Zelst et al. | |
| 2006/0140303 A1 | 6/2006 | Egashira et al. | |
| 2006/0193340 A1 | 8/2006 | Jones et al. | |
| 2006/0274852 A1 | 12/2006 | Trachewsky et al. | |
| 2007/0002749 A1 | 1/2007 | Sondur et al. | |

(Continued)

FOREIGN PATENT DOCUMENTS

EP  1693972  8/2006

(Continued)

OTHER PUBLICATIONS

Gross J., et al., "Dynamic Multi-user OFDM for 802.11 systems. IEEE 802.11-07/2062r1" [Online] Jul. 15, 2007, pp. 1-23, XP002554723 Retrieved from the Interet: URL:www.tkn.tu-berlin.de/publications/papers/11-07-2062-01.pdf>.

(Continued)

*Primary Examiner* — Chieh M Fan
*Assistant Examiner* — Janice Tieu
(74) *Attorney, Agent, or Firm* — Kenyon S. Jenckes

(57) ABSTRACT

Techniques and apparatus for embedding one or more bits of 802.11 Very High Throughput (VHT) information in existing IEEE 802.11 preamble fields are provided. As will be described herein, because different combinations of modulation techniques, coding schemes, and transmission lengths result in the same transmit time (e.g., in terms of symbol length), a clever choice of modulation, coding, and length may allow some extra information to be embedded in a legacy field for use by VHT stations. In this manner, the total VHT preamble transmission time may potentially be reduced, thereby increasing the efficiency of the physical layer (PHY). Moreover, the embedded bits may most likely be invisible to legacy stations, since the transmission time that such stations compute will be independent of these bits by design.

34 Claims, 7 Drawing Sheets

U.S. PATENT DOCUMENTS

| | | | |
|---|---|---|---|
| 2009/0097455 | A1 | 4/2009 | Hoffmann et al. |
| 2009/0225727 | A1 | 9/2009 | Chen |
| 2010/0046656 | A1 | 2/2010 | Van Nee et al. |
| 2010/0290449 | A1 | 11/2010 | Van Nee et al. |

FOREIGN PATENT DOCUMENTS

| | | | |
|---|---|---|---|
| JP | 2008500783 | A | 1/2008 |
| WO | WO2005119922 | A2 | 12/2005 |

OTHER PUBLICATIONS

International Search Report and Written Opinion—PCT/US2009/053191, International Search Authority—European Patent Office—Nov. 23, 2009.

* cited by examiner

EMBEDDING INFORMATION IN AN 802.11 SIGNAL FIELD

CROSS-REFERENCE TO RELATED APPLICATION

This application claims benefit of U.S. Provisional Patent Application Ser. No. 61/089,192, entitled "EMBEDDING INFORMATION IN 802.11N SIGNAL FIELD" filed Aug. 15, 2008, which is herein incorporated by reference in its entirety.

FIELD

Certain embodiments of the present disclosure generally relate to wireless communication and, more specifically, to embedding information in an existing IEEE 802.11n field.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems. SDMA techniques may be adopted in several emerging wireless communications standards such as IEEE 802.11 (IEEE is the acronym for the Institute of Electrical and Electronic Engineers, 3 Park Avenue, 17th floor, New York, N.Y.) and Long Term Evolution (LTE).

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial channels, where, for all practical purposes, $N_S \leq \min\{N_T, N_R\}$. The $N_S$ spatial channels may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S \leq \min\{N_T, \text{sum}(N_R)\}$, where $\text{sum}(N_R)$ represents the summation of all user terminal receive antennas. When SDMA is transmitted to an access point, $N_S \leq \min\{\text{sum}(N_T), N_R\}$, where $\text{sum}(N_T)$ represents the summation of all user terminal transmit antennas.

SUMMARY

Certain embodiments of the present disclosure provide a method for encoding information in a preamble of an orthogonal frequency-division multiplexed (OFDM) wireless communications frame. The method generally includes determining a number B of bits, from a plurality of bits of the frame preamble used to specify one or more properties of a transmission, and encoding the information using the B bits, wherein a duration S of the transmission measured in OFDM symbols is the same regardless of the values of the B bits used to encode the information. For some embodiments, the one or more properties of the transmission may be a length L of the transmission.

Certain embodiments of the present disclosure provide a computer-program product for encoding information in a preamble of an OFDM wireless communications frame. The computer-program product typically includes a computer-readable medium having instructions stored thereon, the instructions being executable by one or more processors. The instructions generally include instructions for determining a number B of bits, from a plurality of bits of the frame preamble used to specify one or more properties of a transmission, and instructions for encoding the information using the B bits, wherein a duration S of the transmission measured in OFDM symbols is the same regardless of the values of the B bits used to encode the information.

Certain embodiments of the present disclosure provide an apparatus for encoding information in a preamble of an OFDM wireless communications frame. The apparatus generally includes means for determining a number B of bits, from a plurality of bits of the frame preamble used to specify one or more properties of a transmission, and means for encoding the information using the B bits, wherein a duration S of the transmission measured in OFDM symbols is the same regardless of the values of the B bits used to encode the information.

Certain embodiments of the present disclosure provide an access point (AP) for encoding information in a preamble of an OFDM wireless communications frame. The AP generally includes logic for determining a number B of bits, from a plurality of bits of the frame preamble used to specify one or more properties of a transmission, and logic for encoding the information using the B bits, wherein a duration S of the transmission measured in OFDM symbols is the same regardless of the values of the B bits used to encode the information.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide techniques and apparatus for embedding one or more bits of 802.11 Very High Throughput (VHT) information in existing IEEE 802.11 preamble fields. As will be described herein, because different combinations of modulation techniques, coding schemes, and transmission lengths result in the same transmit time (e.g., in terms of symbol length), a clever choice of modulation, coding, and length may allow some extra information to be embedded in a legacy field for use by VHT stations. In this manner, the total VHT preamble transmission time may potentially be reduced, thereby increasing the efficiency of the physical layer (PHY). Moreover, the embedded bits may most likely be invisible to legacy stations, since the transmission time that such stations compute will be independent of these bits by design.

The word "exemplary" is used herein to mean "serving as an example, instance, or illustration." Any embodiment described herein as "exemplary" is not necessarily to be construed as preferred or advantageous over other embodiments. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
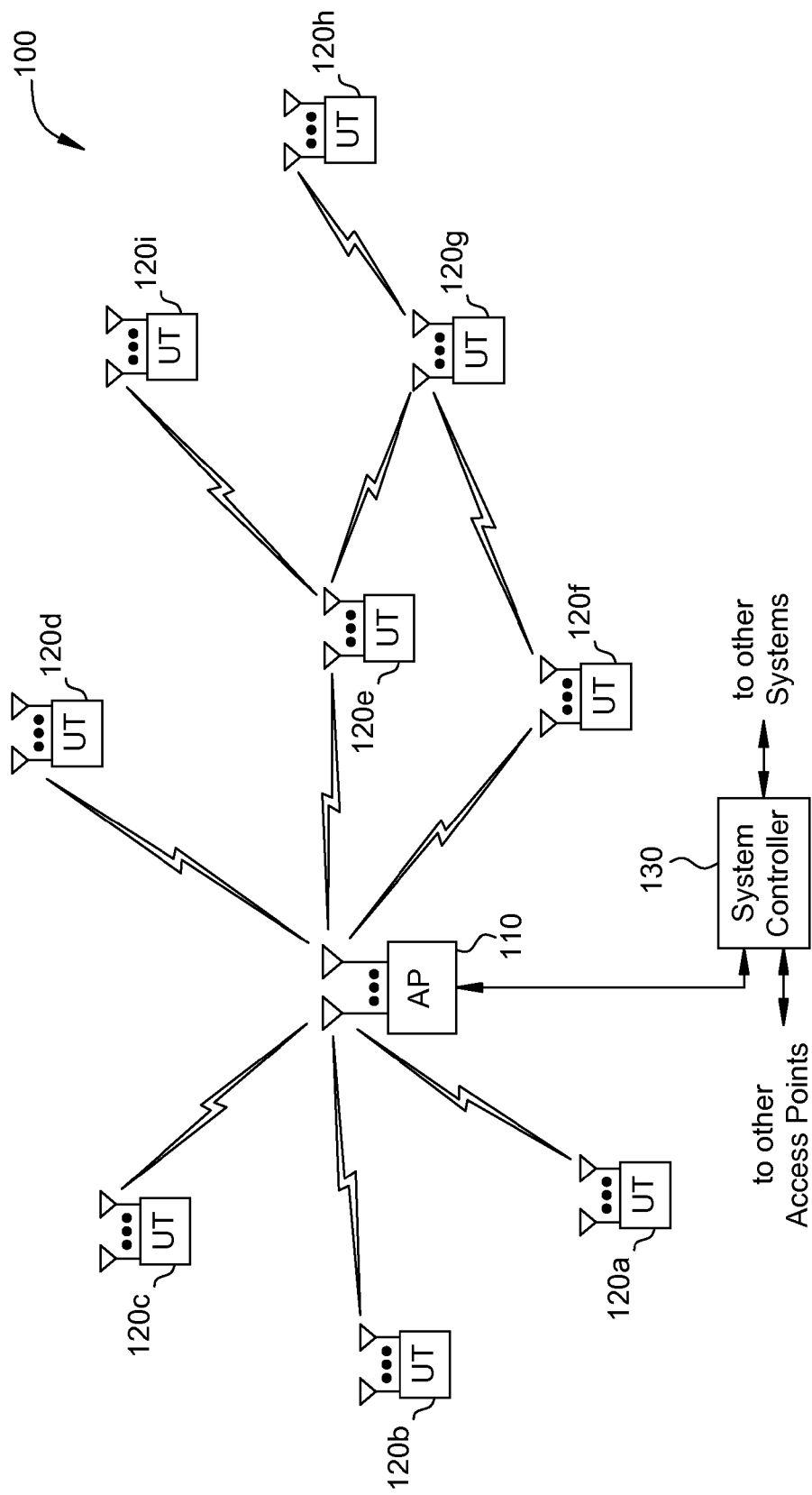
FIG. 1 illustrates a spatial division multiple access (SDMA) multiple-input multiple-output (MIMO) wireless system, in accordance with certain embodiments of the present disclosure.

FIG. 1 shows a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal (UT) may be fixed or mobile and may also be referred to as a mobile station (MS), a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via SDMA, for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDMA, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
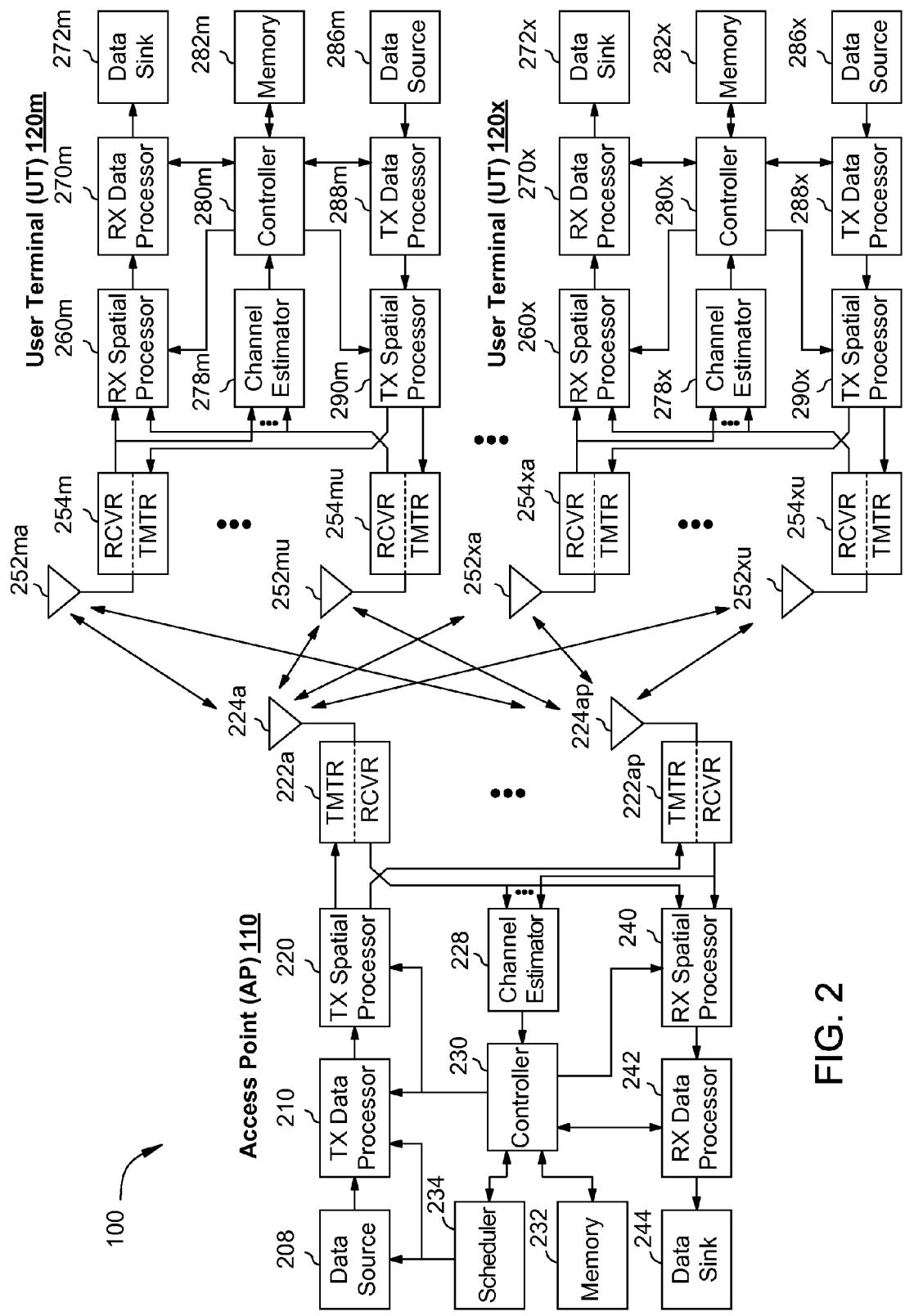
FIG. 2 illustrates a block diagram of an access point (AP) and two user terminals, in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn"

denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink steering vectors, SNR estimates, and so on) to the access point. Controllers 230 and 280 also control the operation of various processing units at access point 110 and user terminal 120, respectively.

Figure 3:
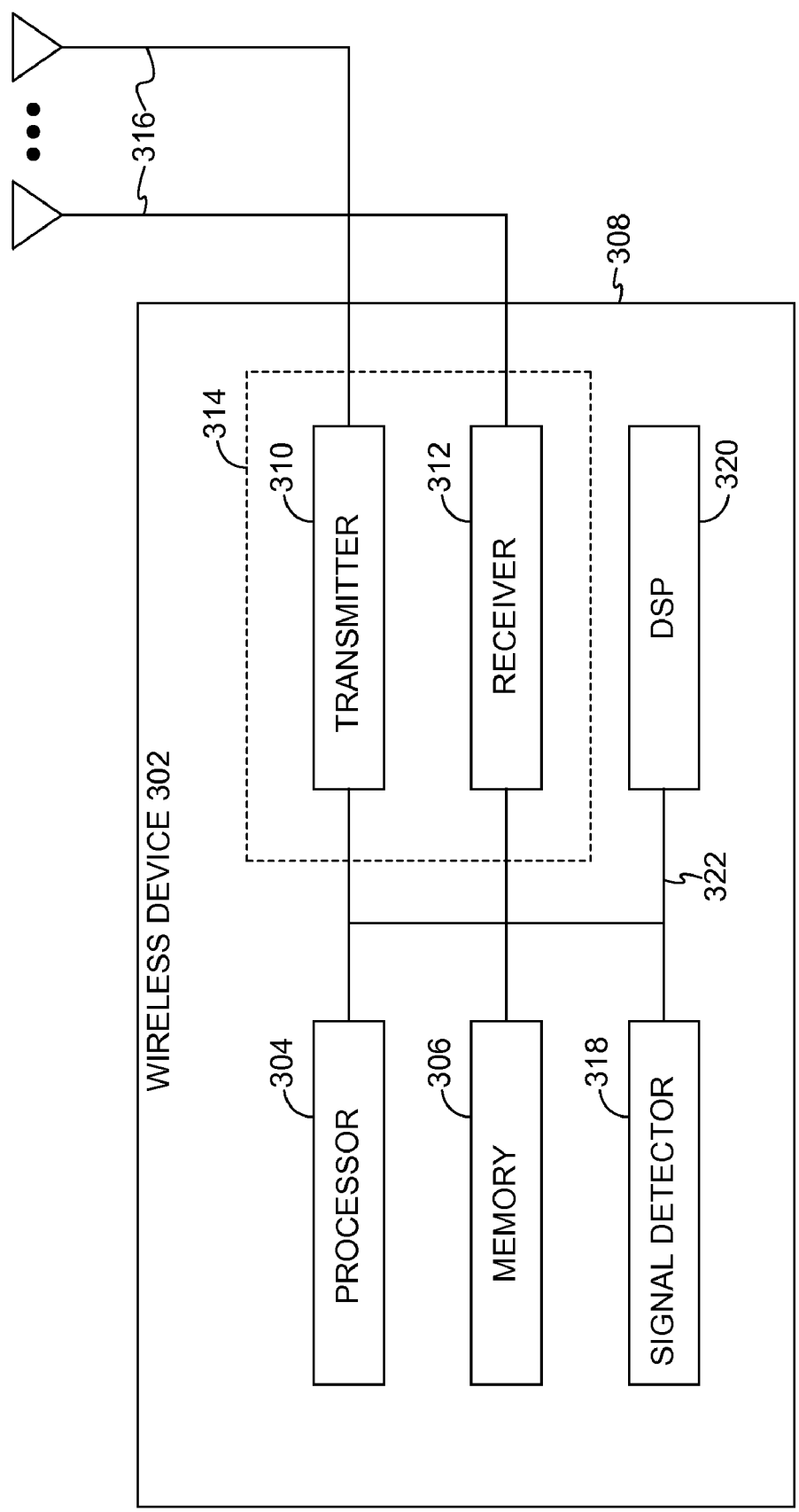
FIG. 3 illustrates various components that may be utilized in a wireless device, in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Embedding Information in an 802.11n Signal Field

In IEEE 802.11 WLAN (Wireless Local Area Network) systems, transmitted frames have a preamble that allows stations to synchronize and obtain information, such as the length and coding rate, about the data packet that follows. The design of the next generation 802.11 Very High Throughput (VHT) system may require a new preamble structure. A typical scheme for signaling VHT preamble information may include all VHT-related information bits in a VHT signal field. Such a VHT signal field may generally be coded at a low data rate to ensure all stations can decode it.

As a result, however, the VHT signal field may be relatively inefficient in terms of data rate. For example, in the 802.11n standard, the signal field may require 8 μs to carry 34 bits of information. Therefore, although it is simple to put all VHT-related bits in the VHT signal field, this approach may cause long preamble transmission times due to the low rate. Accordingly, if the number of VHT-related bits in the VHT signal field could be somehow reduced, the length of the preamble may be decreased, and the physical layer (PHY) efficiency may be increased.

Figure 4:
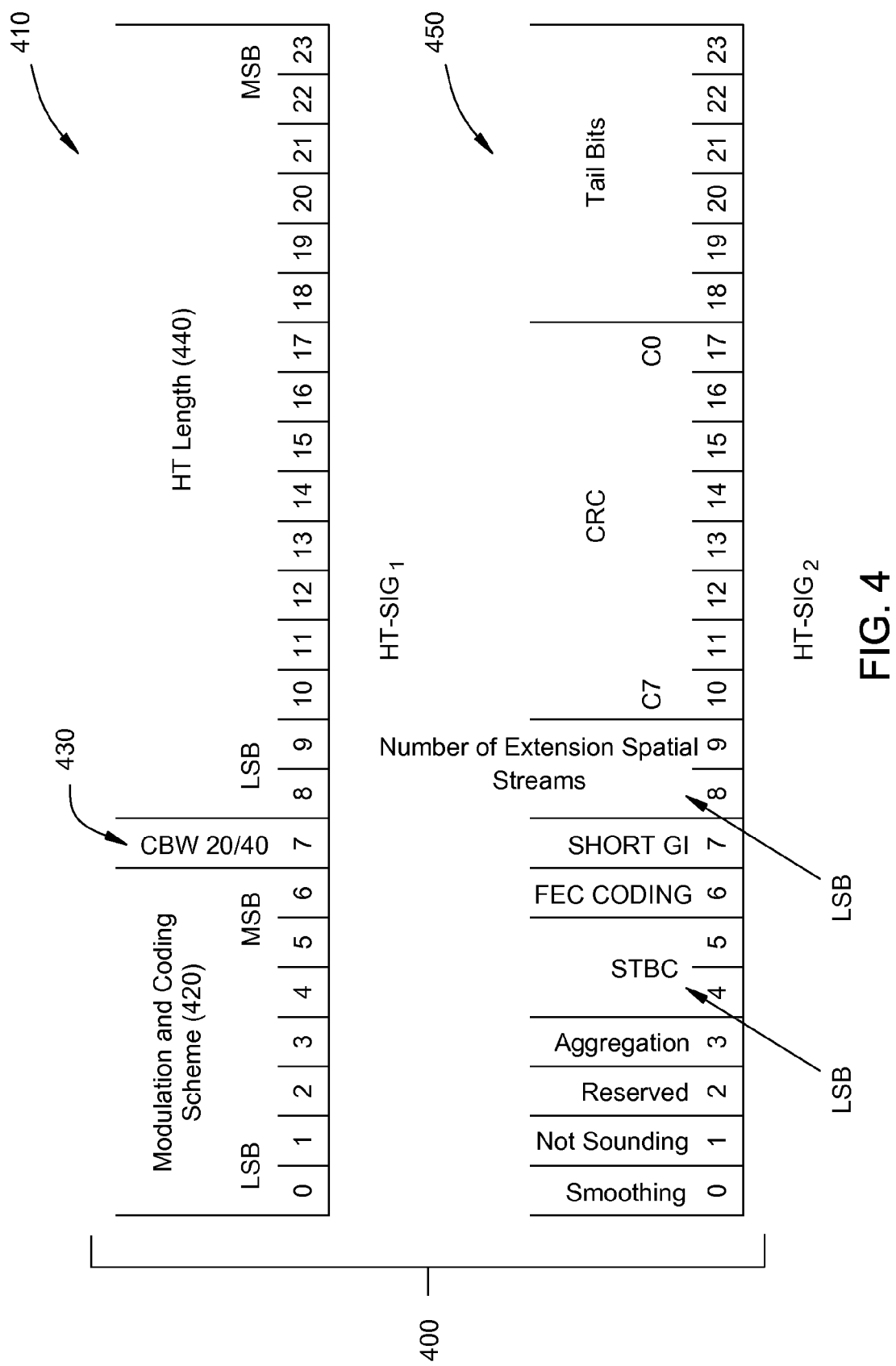
FIG. 4 illustrates the format of an example legacy IEEE 802.11n signal field (High Throughput Signal, or HT-SIG), in accordance with certain embodiments of the present disclosure.

FIG. 4 is a diagram illustrating the format of an example legacy 802.11n signal field known as a High Throughput Signal (HT-SIG) field 400, although any legacy field suitable for embedding VHT bits may be used. FIG. 4 illustrates the format of a first 24-bit portion HT-SIG$_1$ 410 of the 48-bit HT-SIG field 400 and the format of a second 24-bit portion HT-SIG$_2$ 450. The first portion HT-SIG$_1$ 410 includes a 7-bit Modulation and Coding Scheme (MCS) field 420 for conveying the index to the modulation technique and the coding rate used by the access point 110. A 1-bit bandwidth (BW 20/40) field 430 follows the MCS field 420 and may be used to indicate whether 20 MHz or 40 MHz is used. HT-SIG$_1$ 410 also comprises a 16-bit HT Length field 440 for conveying information about the number of bytes of data in the PSDU (PLCP service data unit, where PLCP stands for physical layer convergence procedure). The bits in HT-SIG$_1$ 410 are arranged from least significant bit (LSB) to most significant bit (MSB) As will be described herein, for certain embodiments, some number of LSBs of the HT Length field 440 may be used to encode VHT information.

Figure 5:
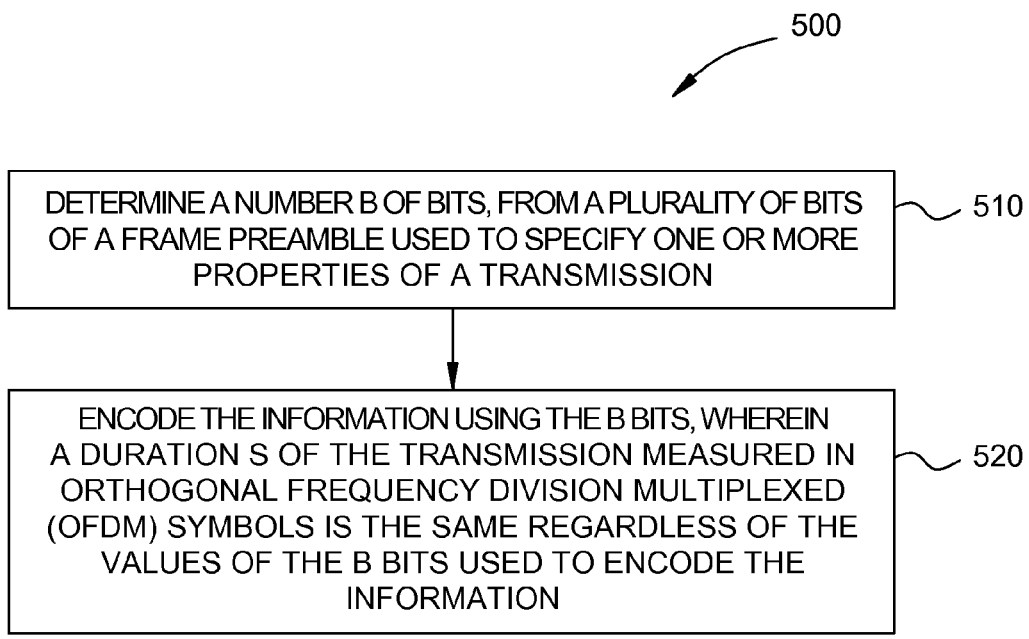
FIG. 5 illustrates example operations for encoding information in bits of a frame preamble, in accordance with certain embodiments of the present disclosure.

FIG. 5 illustrates example operations 500 for encoding information in bits of a frame preamble, according to one embodiment of the disclosure. The operations 500 begin at 510, where a number B of bits are determined from a plurality of the bits of the frame preamble used to specify one or more properties of a transmission (e.g., length). At 520, the B bits (determined at 510) are used to encode the information, wherein a duration S of the transmission measured in orthogonal frequency division multiplexed (OFDM) symbols is the same regardless of the values of the B bits used to encode the information. In this manner, B VHT-related information bits may be embedded in the frame preamble, thereby shortening the number of VHT-related information bits (by B bits) that may be included in a VHT signal field and, in turn, shortening the total preamble transmission time. Determining a number B of bits and a duration of S symbols is described in greater detail below.

In an effort to embed information bits in an existing preamble field, the relationship between the MCS/length combination and the transmit time may be determined. Assume that R is the data rate in Mbps (megabits per second), which may be set by the MCS field 420 of HT-SIG 400. Also assume that L is the transmission length in bytes, and S is the transmission duration in OFDM symbols. Assume further that 4 μs per symbol is used when calculating R, resulting in the following formula:

$$S = \left\lceil \frac{2L}{R} \right\rceil$$

Rounding up in the above equation is used since the number of symbols S must be a whole number (i.e., without a fractional part). The realization that different transmission lengths L can yield the same transmission duration S for a given data rate R according to the above equation is what allows for a number B of bits to be embedded in the HT Length field 440 of HT-SIG 400. For a given S, the range of the length L is given by the following formula:

$$\frac{R(S-1)}{2} < L \leq \frac{RS}{2}$$

According to embodiments of the present disclosure, there is a desire to embed information in the least significant B bits of the HT Length field 440 without affecting the transmission duration S. In such a situation, an integer k is determined such that the length expression $L_0 = 2^B k$ (where $L_0 < 2^{16}$ for the 16-bit HT Length field 440) satisfies the following condition:

$$2^B k > \frac{R(S-1)}{2} \text{ and } 2^B k + 2^B - 1 \leq \frac{RS}{2}$$

$$\Rightarrow \frac{R(S-1)}{2^{B+1}} < k \leq \frac{RS+2}{2^{B-1}} - 1$$

Note that an integer solution k will always exist under the following condition:

$$\frac{RS+2}{2^{B-1}} - 1 - \frac{R(S-1)}{2^{B+1}} \geq 1 \Rightarrow R \geq 2^{B+2} - 2$$

Thus, one possible solution for the length expression is the following:

$$L_0 = 2^B \left\lfloor \frac{RS+2}{2^{B+1}} - 1 \right\rfloor$$

Figure 6A:
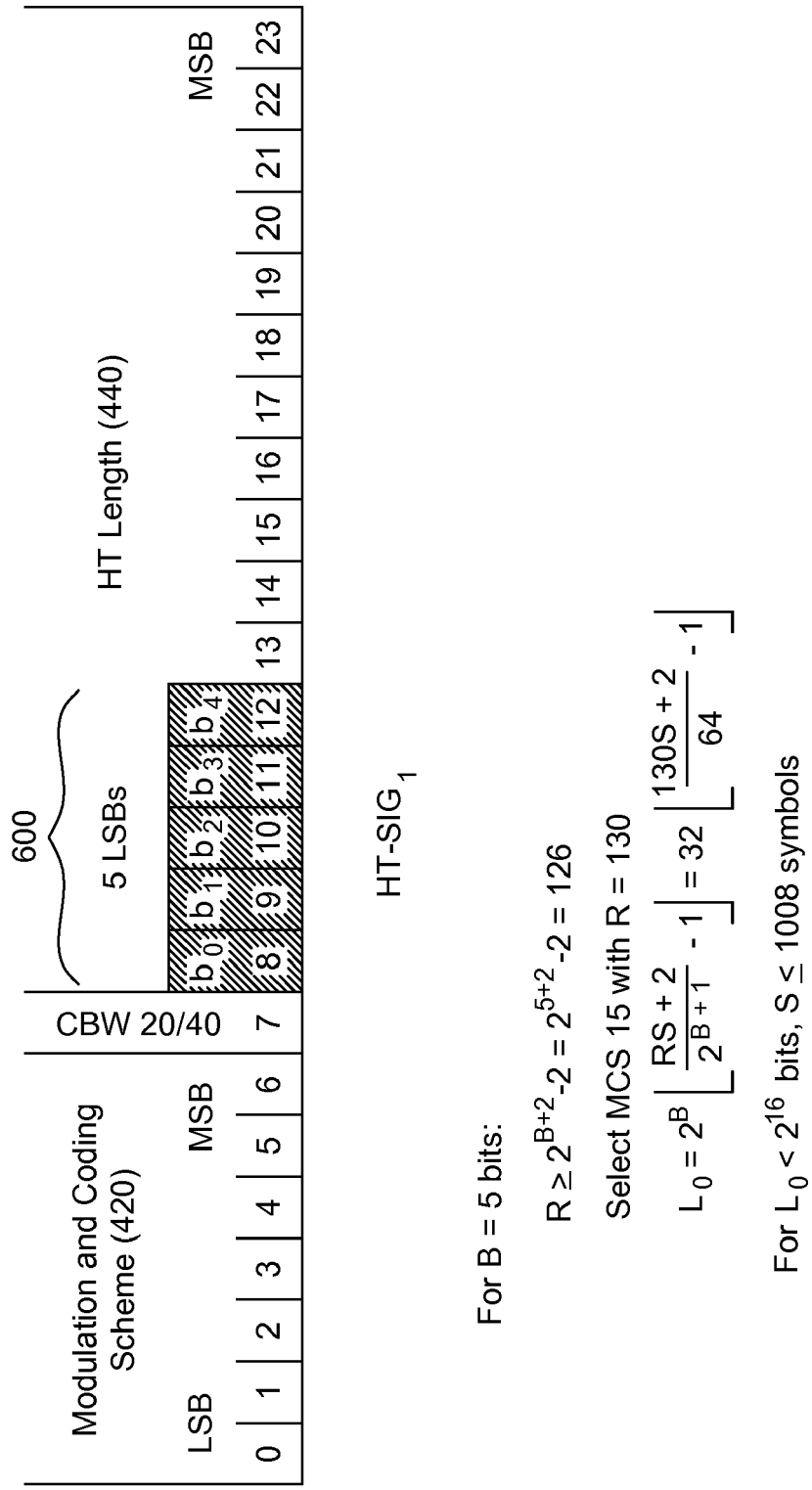
FIGS. 6A and 6B illustrate examples for embedding information in the HT-SIG field, in accordance with certain embodiments of the present disclosure.

FIG. 6A illustrates a first example of determining a transmission duration S, according to certain embodiments of the disclosure. In this example, suppose a desire to embed B=5 bits of information, such as VHT-related information bits. Assume also that the index of the Modulation and Coding Scheme field 420 of HT-SIG 400 is 15 (MCS 15) such that R=130 Mbps in 20 MHz. Note that $R \geq 2^{B+2} - 2 = 126$. For a transmission duration of S symbols, the result is:

$$L_0 = 32 \left\lfloor \frac{130S+2}{64} - 1 \right\rfloor$$

Thus, in this example, the 5 LSBs of $L_0$ can be set to any value required to carry information, and the resulting transmission duration S will always be constant per the following formula:

$$S = \left\lceil \frac{2L}{R} \right\rceil$$

In other words, the 5 LSBs ($b_0$ to $b_4$) 600 of the 16-bit HT Length field 440 may contain VHT-related information. In this example, a transmission duration S=1008 symbols is the maximum allowed to keep $L_0$ within 16 bits. This enables a transmission opportunity (TXOP) of up to 4 ms.

Figure 6B:
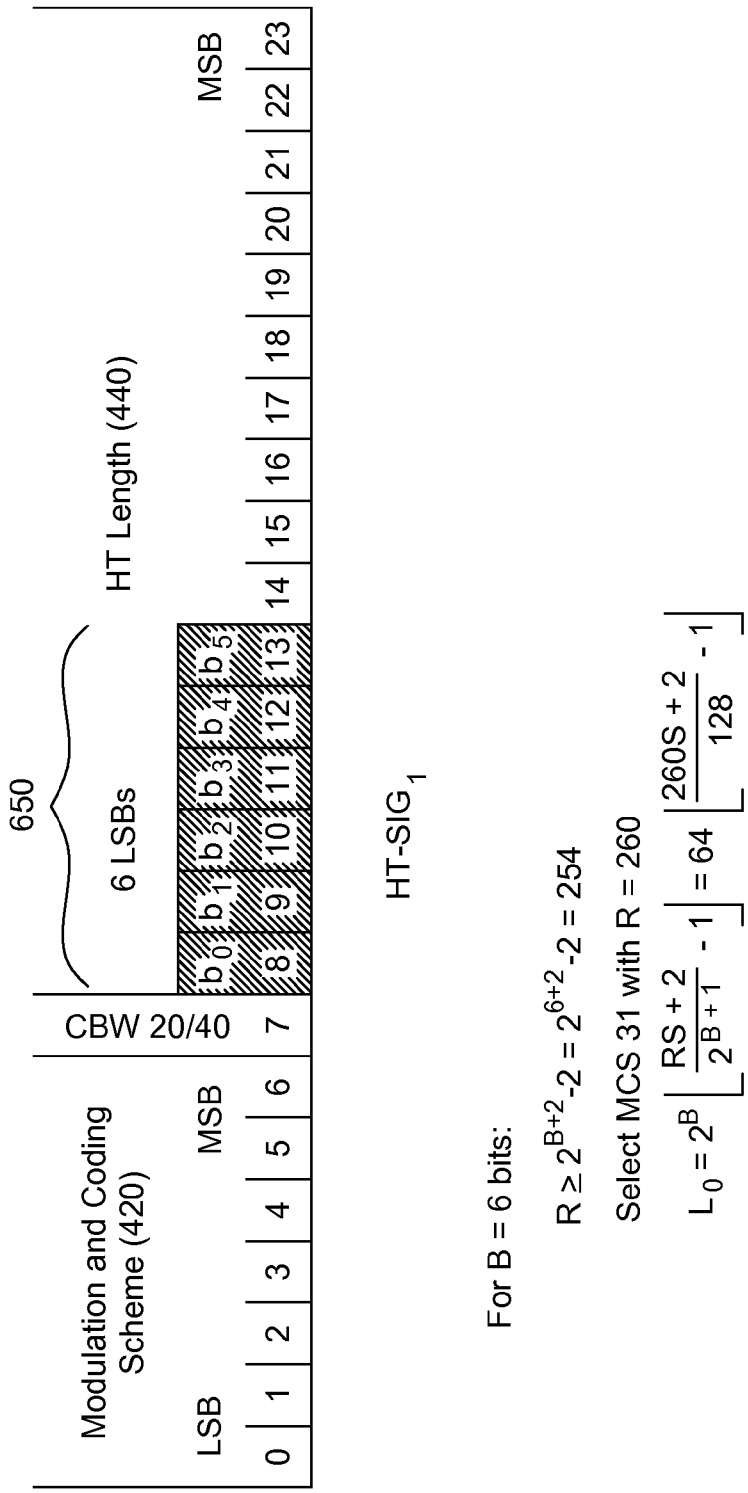

FIG. 6B illustrates a second example of determining a transmission duration S, according to certain embodiments of the disclosure. In this example, suppose a desire to embed B=6 bits of information. Assume also that the index of the Modulation and Coding Scheme field 420 of HT-SIG 400 is 31 (MCS 31) is selected such that R=260 Mbps in 20 MHz. Note that $R \geq 2^{B+2}-2=254$. For a transmission duration of S symbols, the result is:

$$L_0 = 64 \left\lceil \frac{260S + 2}{128} - 1 \right\rceil$$

Thus, in this example, the 6 LSBs of $L_0$ can be set to any value required to carry information, and the resulting transmission duration S will always be constant. In other words, the 6 LSBs ($b_0$ to $b_5$) 650 of the 16-bit HT Length field 440 may contain VHT-related information. In this example, a transmission duration S=504 symbols is the maximum allowed to keep $L_0$ within 16 bits. This enables a TXOP of up to 2 ms.

To note, there may be one broadcast HT-SIG field 400 intended for reception by many stations (STAs), transmitted, for example, via an SDMA downlink. Therefore, the VHT-related information selected for bits embedded in the HT-SIG field 400 may most likely carry general information about the network. VHT STAs in a network would know about the embedded bits according to embodiments of the present disclosure and would be able to interpret them, whereas legacy STAs may most likely overlook these embedded bits and only interpret such bits as conveying part of the length of the PSDU.

Figure 5A:
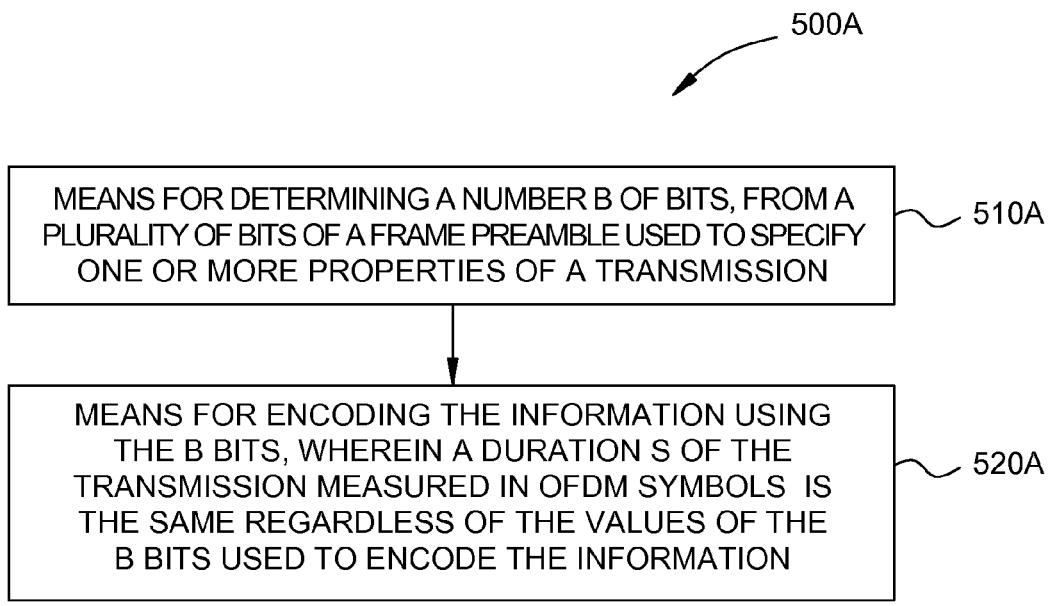
FIG. 5A is a block diagram of means corresponding to the example operations of FIG. 5 for encoding information in bits of a frame preamble, in accordance with certain embodiments of the present disclosure.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, blocks 510-520 illustrated in FIG. 5 correspond to means-plus-function blocks 510A-520A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for encoding information in a preamble of an orthogonal frequency-division multiplexed (OFDM) wireless communications frame, comprising:
   determining a number B of bits, from a plurality of bits of the frame preamble used to specify one or more properties of a transmission; and
   encoding the information using the B bits, wherein a duration S of the transmission measured in OFDM symbols is the same regardless of the values of the B bits used to encode the information,
   wherein the one or more properties of the transmission comprise a length L of the transmission, and
   wherein a data rate R is measured in megabits per second (Mbps) and the length L in bytes may range between R(S−1)/2<L RS/2 for the duration S assuming 4 µs per symbol for the data rate R.

2. The method of claim 1, wherein determining the number B of bits comprises determining a data rate R and a symbol period.

3. The method of claim 1, wherein determining the number B of bits comprises using a lookup table according to a data rate R and the duration S of the transmission.

4. The method of claim 1, wherein the plurality of bits used to specify the length L are in a High Throughput Signal (HT-SIG) field of the frame preamble.

5. The method of claim 4, wherein the B bits are least significant bits (LSBs) of an HT Length field of the HT-SIG field.

6. The method of claim 1, wherein the data rate R is specified in a Modulation and Coding Scheme (MCS) field of a High Throughput Signal (HT-SIG) field of the frame preamble.

7. The method of claim 1, wherein determining the number B of bits comprises selecting the data rate R such that $R(S-1)/2^{B+1} < k \leq RS+2/2^{B+1}-1$ has an integer solution k.

8. The method of claim 7, wherein determining the number B of bits comprises determining a length $L_0$ such that $L_0 = 2^B k$, where k is an integer such that $$\frac{R(S-1)}{2^{B+1}} < k \leq \frac{RS+2}{2^{B+1}} - 1.$$

9. The method of claim 1, wherein the data rate R=130 Mbps, the number B of bits is 5, and the length L is less than $2^{16}$.

10. The method of claim 1, wherein the data rate R=260 Mbps, the number B of bits is 6, and the length L is less than $2^{16}$.

11. A computer-program product for encoding information in a preamble of an orthogonal frequency-division multiplexed (OFDM) wireless communications frame, comprising a non-transitory computer-readable medium having instructions stored thereon, the instructions being executable by one or more processors and the instructions comprising:
   instructions for determining a number B of bits, from a plurality of bits of the frame preamble used to specify one or more properties of a transmission; and
   instructions for encoding the information using the B bits, wherein a duration S of the transmission measured in OFDM symbols is the same regardless of the values of the B bits used to encode the information,
   wherein the one or more properties of the transmission comprise a length L of the transmission, and
   wherein a data rate R is measured in megabits per second (Mbps) and the length L in bytes may range between $$\frac{R(S-1)}{2} < L \leq \frac{RS}{2}$$

for the duration S assuming 4 µs per symbol for the data rate R.

12. The computer-program product of claim 11, wherein the instructions for determining the number B of bits comprise instructions for determining a data rate R and a symbol period.

13. The computer-program product of claim 11, wherein the instructions for determining the number B of bits comprise instructions for using a lookup table according to a data rate R and the duration S of the transmission.

14. The computer-program product of claim 11, wherein the plurality of bits used to specify the length L are in a High Throughput Signal (HT-SIG) field of the frame preamble.

15. The computer-program product of claim 14, wherein the B bits are least significant bits (LSBs) of an HT Length field of the HT-SIG field.

16. The computer-program product of claim 11, wherein the data rate R is specified in a Modulation and Coding Scheme (MCS) field of a High Throughput Signal (HT-SIG) field of the frame preamble.

17. The computer-program product of claim 11, wherein the instructions for determining the number B of bits comprise instructions for selecting the data rate R such that $$\frac{R(S-1)}{2^{B+1}} < k \leq \frac{RS+2}{2^{B+1}} - 1$$

has an integer solution k.

18. The computer-program product of claim 17, wherein the instructions for determining the number B of bits comprise instructions for determining a length $L_0$ such that $L_0 = 2^B k$, where k is an integer such that $$\frac{R(S-1)}{2^{B+1}} < k \leq \frac{RS+2}{2^{B+1}} - 1.$$

19. An apparatus for encoding information in a preamble of an orthogonal frequency-division multiplexed (OFDM) wireless communications frame, comprising:
 means for determining a number B of bits, from a plurality of bits of the frame preamble used to specify one or more properties of a transmission; and
 means for encoding the information using the B bits, wherein a duration S of the transmission measured in OFDM symbols is the same regardless of the values of the B bits used to encode the information,
 wherein the one or more properties of the transmission comprise a length L of the transmission, and
 wherein a data rate R is measured in megabits per second (Mbps) and the length L in bytes may range between $$\frac{R(S-1)}{2} < L \leq \frac{RS}{2}$$

for the duration S assuming 4 µs per symbol for the data rate R.

20. The apparatus of claim 19, wherein the means for determining the number B of bits comprise means for determining a data rate R and a symbol period.

21. The apparatus of claim 19, wherein the means for determining the number B of bits comprises means for using a lookup table according to a data rate R and the duration S of the transmission.

22. The apparatus of claim 19, wherein the plurality of bits used to specify the length L are in a High Throughput Signal (HT-SIG) field of the frame preamble.

23. The apparatus of claim 22, wherein the B bits are least significant bits (LSBs) of an HT Length field of the HT-SIG field.

24. The apparatus of claim 19, wherein the data rate R is specified in a Modulation and Coding Scheme (MCS) field of a High Throughput Signal (HT-SIG) field of the frame preamble.

25. The apparatus of claim 19, wherein the means for determining the number B of bits comprise means for selecting the data rate R such that $$\frac{R(S-1)}{2^{B+1}} < k \leq \frac{RS+2}{2^{B+1}} - 1$$

has an integer solution k.

26. The apparatus of claim 25, wherein the means for determining the number B of bits comprise means for determining a length $L_0$ such that $L_0=2^B k$, where k is an integer such that $$\frac{R(S-1)}{2^{B+1}} < k \leq \frac{RS+2}{2^{B+1}} - 1.$$

27. An access point (AP) for encoding information in a preamble of an orthogonal frequency-division multiplexed (OFDM) wireless communications frame, comprising:
 logic for determining a number B of bits, from a plurality of bits of the frame preamble used to specify one or more properties of a transmission; and
 logic for encoding the information using the B bits, wherein a duration S of the transmission measured in OFDM symbols is the same regardless of the values of the B bits used to encode the information,
 wherein the one or more properties of the transmission comprise a length L of the transmission, and
 wherein a data rate R is measured in megabits per second (Mbps) and the length L in bytes may range between $$\frac{R(S-1)}{2} < L \leq \frac{RS}{2}$$

for the duration S assuming 4 µs per symbol for the data rate R.

28. The access point of claim 27, wherein the logic for determining the number B of bits is configured to determine a data rate R and a symbol period.

29. The access point of claim 27, wherein the logic for determining the number B of bits is configured to use a lookup table according to a data rate R and the duration S of the transmission.

30. The access point of claim 27, wherein the plurality of bits used to specify the length L are in a High Throughput Signal (HT-SIG) field of the frame preamble.

31. The access point of claim 30, wherein the B bits are least significant bits (LSBs) of an HT Length field of the HT-SIG field.

32. The access point of claim 27, wherein the data rate R is specified in a Modulation and Coding Scheme (MCS) field of a High Throughput Signal (HT-SIG) field of the frame preamble.

33. The access point of claim 27, wherein the logic for determining the number B of bits is configured to select the data rate R such that $$\frac{R(S-1)}{2^{B+1}} < k \leq \frac{RS+2}{2^{B+1}} - 1$$

has an integer solution k.

34. The access point of claim 33, wherein the logic for determining the number B of bits is configured to determine a length $L_0$ such that $L_0=2^B k$, where k is an integer such that $$\frac{R(S-1)}{2^{B+1}} < k \leq \frac{RS+2}{2^{B+1}} - 1.$$

\* \* \* \* \*